(12) United States Patent
Feldstein et al.

(10) Patent No.: US 7,225,117 B1
(45) Date of Patent: May 29, 2007

(54) METHOD FOR GENERATING A SIMULATED NETWORK USING A GRAPHICAL USER INTERFACE

(75) Inventors: Jeffrey B. Feldstein, Goleta, CA (US); Tarun Raisoni, Mountain View, CA (US); Donald T. Wooton, Hollister, CA (US)

(73) Assignee: Cisco Technology, Inc., San Jose, CA (US)

( * ) Notice: Subject to any disclaimer, the term of this patent is extended or adjusted under 35 U.S.C. 154(b) by 560 days.

(21) Appl. No.: 10/773,983

(22) Filed: Feb. 5, 2004

(51) Int. Cl.
*G06F 13/10* (2006.01)

(52) U.S. Cl. ............... 703/21; 703/13; 703/20; 703/23; 715/736; 709/223; 709/252; 370/254; 370/241; 370/218

(58) Field of Classification Search ........ 345/736; 703/13, 21; 709/220–226; 370/254, 241
See application file for complete search history.

(56) References Cited

U.S. PATENT DOCUMENTS

| | | | |
|---|---|---|---|
| 6,014,697 A * | 1/2000 | Lewis et al. ............... | 709/223 |
| 6,058,103 A * | 5/2000 | Henderson et al. ......... | 370/254 |
| 6,714,217 B2 * | 3/2004 | Huang et al. ............... | 715/736 |
| 6,728,214 B1 * | 4/2004 | Hao et al. ................... | 370/241 |
| 7,117,273 B1 * | 10/2006 | O'Toole et al. ............. | 709/252 |
| 2001/0033548 A1 * | 10/2001 | Saleh et al. ................. | 370/218 |
| 2003/0212908 A1 * | 11/2003 | Piesco ........................ | 713/201 |
| 2004/0155900 A1 * | 8/2004 | Huang et al. ............... | 345/736 |

OTHER PUBLICATIONS

"Network Simulations with OPNET", X. Chang, Proceedings of 1999 Winter Simulation Conference, IEEE 1999.*
"OPNET Modeler", Product Description, OPNET Technologies Inc., Mar. 2001.*
"OPNET Modeler and Ns-2: Comparing the Accuracy of Network Simulators for Packet-Level Analysis using a Network Testbed", Lucio et al, University of Essex, Jul. 2003.*

* cited by examiner

*Primary Examiner*—Fred Ferris
(74) *Attorney, Agent, or Firm*—Marger Johnson & McCollom, P.C.

(57) ABSTRACT

A method for generating a simulated network using a graphical user interface (GUI). A network topology generated at a GUI by a user is received, wherein the network topology includes a plurality of devices and at least one connection between devices. A build file describing the network based on the network topology is automatically generated. A user is able to create and edit a simulated network through the GUI, thereby obviating the need for manually coding a simulated network. Large simulated networks can be quickly created, edited and maintained.

19 Claims, 6 Drawing Sheets

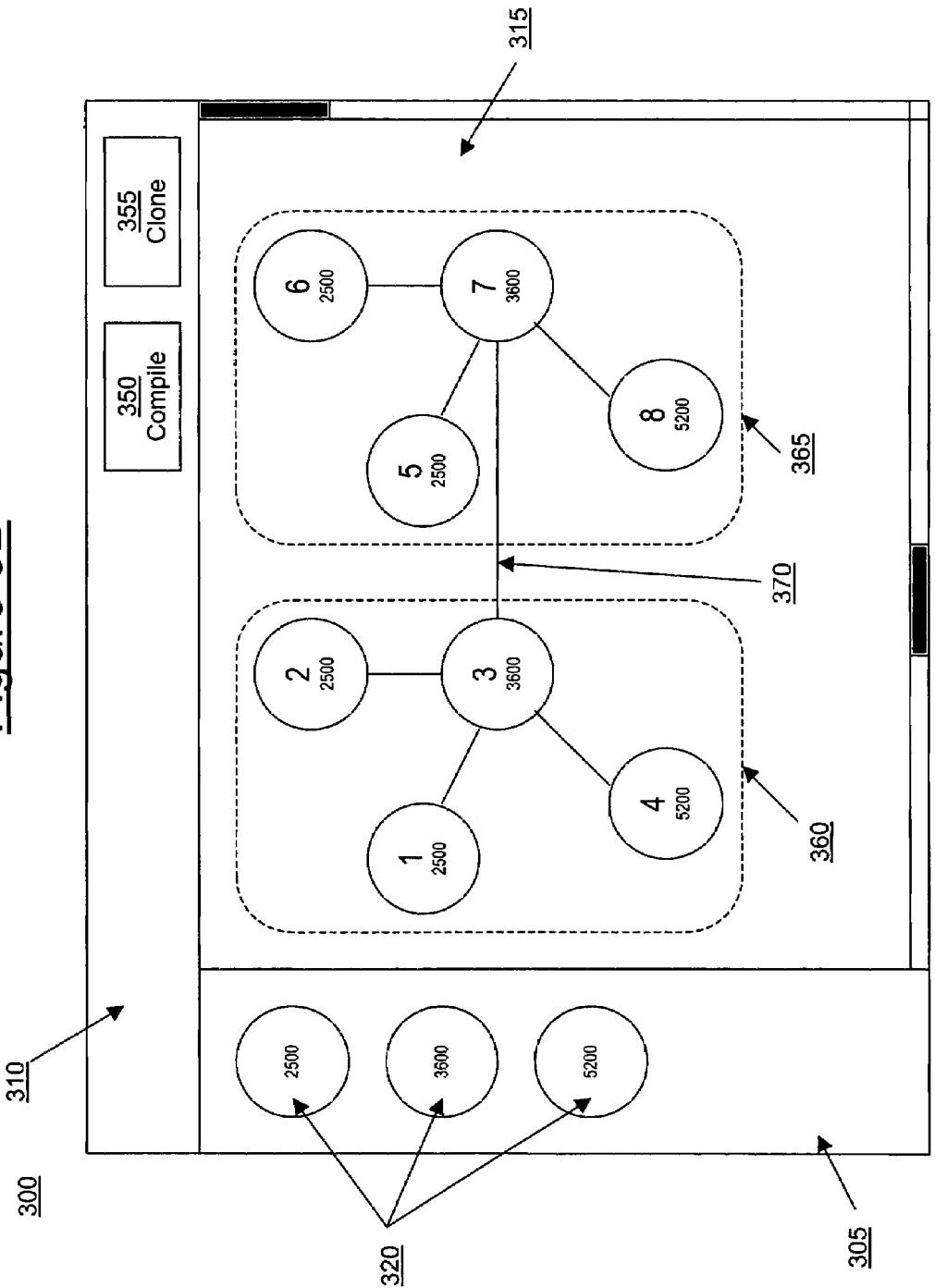

| Device | Type | Operating System |
|--------|------|------------------|
| 1 | 2500 | 10.5 |
| 2 | 2500 | 12.2 |
| 3 | 3600 | 10.5 |
| 4 | 5200 | 12.3 |
| ... | ... | ... |

| Interface | Type | Up/Down | Neighbor |
|-----------|------|---------|----------|
| e0 | 10 MB | Up | 2 |
| e1 | 10 MB | Down | 1 |
| e2 | 1 GB | Up | 4 |

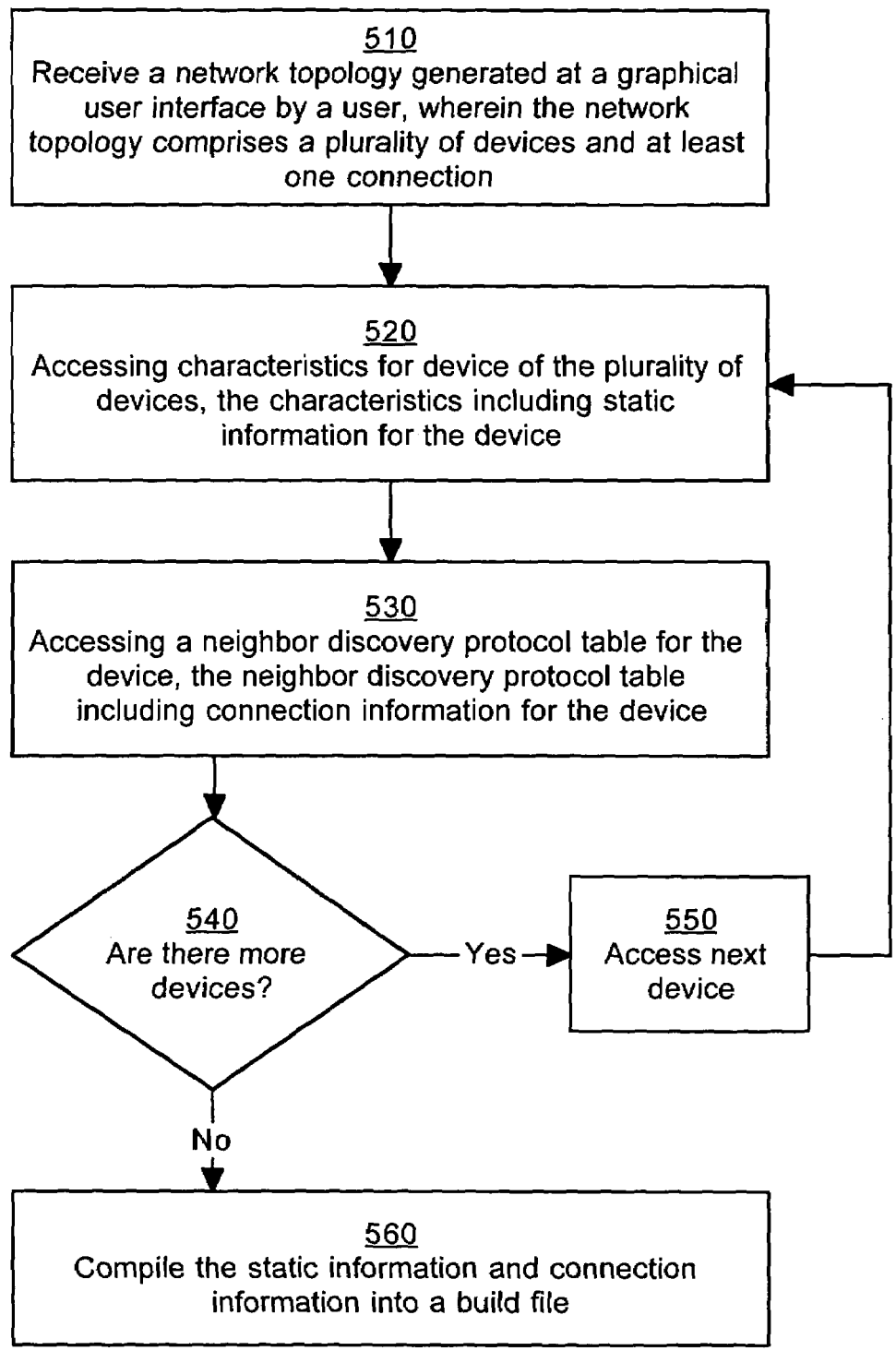

METHOD FOR GENERATING A SIMULATED NETWORK USING A GRAPHICAL USER INTERFACE

FIELD OF INVENTION

The present invention relates to the field of computer network simulation. Specifically, the present invention relates to a method for generating a simulated network using a graphical user interface.

BACKGROUND OF THE INVENTION

In a large enterprise with a large number of computing devices, the networking infrastructure can be extraordinarily complex. For example, a network of a large enterprise may include five to ten thousand devices. Network management systems are typically employed to monitor the network in order to ensure that the network is functioning properly. CiscoWorks by Cisco Systems is an example of a network management system.

In order to ensure proper functioning of a network management system, it is necessary to test the network management system while connected to a network. In the past, the network management system would often be connected to a network of an enterprise. However, due to security and network disruption concerns, enterprises are no longer open to this sort of testing.

Currently, one way to test a network management system is to set up an actual network. For example, a network of ten to one hundred devices can be set up, and the network management system is used for monitoring the network. This method assumes that if the network management system works for a network of up to one hundred devices, it will work for a network of several thousand devices. However, this assumption is not always valid, as network complexity gets much greater in as the number of devices increases.

Another way for testing a network management system is to connect the network management system to a simulated network. A simulated network is typically a data file and software system that is able to convince the network management system that it is connected to and monitoring an actual network. Network simulation tools exist for assisting a user in creating a simulated network. Specifically, typical network simulation tools allow a user to specify devices of the simulated network. However, it is necessary for the user to manually enter in connection information for each device. That is, for a configuration file that identifies the connections between the devices must be created or edited for each device. For simulating a large network of several thousand devices this is very time consuming, thereby consuming substantial human and financial resources of the enterprise.

SUMMARY OF THE INVENTION

Accordingly, a need exists for method or system that allows a user to easily select devices of a network and place connections between the devices of a simulated network using a graphical user interface. A need also exists for a method or system that satisfies the above need, and provides a user with easy customization of the devices and connections of the simulated network. Furthermore, a need exists for a method or system that satisfies the above needs, and automatically generates the simulated network based on the devices and the connections.

Various embodiments of the present invention, a method for generating a simulated network, are described herein. In one embodiment, a network topology generated at a graphical user interface by a user is received, wherein the network topology includes a plurality of devices and at least one connection. In one embodiment, the plurality of devices includes routers and switches. A build file describing the network is automatically generated based on the network topology. In one embodiment, the build file is text file. In one embodiment, the build file is for use by a network management simulator to simulate a network.

In one embodiment, characteristics for at least one device of the plurality of devices are accessed, wherein the characteristics include static information for the device. In one embodiment, the static information includes the device type, the device operating system version and the device interface information. A neighbor discovery protocol table for the device is accessed, wherein the neighbor discovery protocol table includes connection information for the device. In one embodiment, the connection information of the neighbor discovery protocol table includes identification of a neighbor device for an active interface of the device. The static information and connection information are compiled into the build file. In one embodiment, the accessing the characteristics, the accessing the neighbor discovery protocol table, and the compiling is repeated for the plurality of devices.

In another embodiment, the present invention provides a graphical user interface (GUI) for use in generating a simulated network. A first display region of the GUI is for displaying a plurality of icons, wherein an icon is associated with a respective device. The first display region presents icons for user selection thereof. In one embodiment, the devices include routers and switches. A second display region of the GUI is for displaying icons selected from the first display region and for receiving user drawn connections between the icons.

A compiling element of the GUI is for automatically generating a simulated network based on the selected icons and the connections in response to a user selection. In one embodiment, the GUI further includes a cloning element for cloning a grouping of user-selected icons and connections.

In one embodiment, the simulated network is generated based on characteristics and neighbor discovery protocol tables for the devices associated with the icons, wherein the characteristics include static information for the devices and the neighbor discovery protocol tables include connection information for the devices. In one embodiment, the static information includes the device type, the device operating system version and the device interface information. In one embodiment, the connection information of the neighbor discovery protocol table includes identification of a neighbor device for an active interface of the device.

In one embodiment, the static information and connection information for the devices is compiled into a build file representing the simulated network. In one embodiment, the build file is text file. In one embodiment, the build file is for use by a network management simulator to simulate a network.

BRIEF DESCRIPTION OF THE DRAWINGS

The accompanying drawings, which are incorporated in and form a part of this specification, illustrate embodiments of the invention and, together with the description, serve to explain the principles of the invention:

FIGS. 3A and 3B are screen shots of an exemplary graphical user interface (GUI) for use in generating a simulated network, in accordance with one embodiment of the present invention.

FIGS. 4A and 4B are tables of an exemplary build file, in accordance with one embodiment of the present invention.

FIG. 5 is a flow chart illustrating a method for generating a simulated network, in accordance with one embodiment of the present invention.

DETAILED DESCRIPTION

Figure 1:
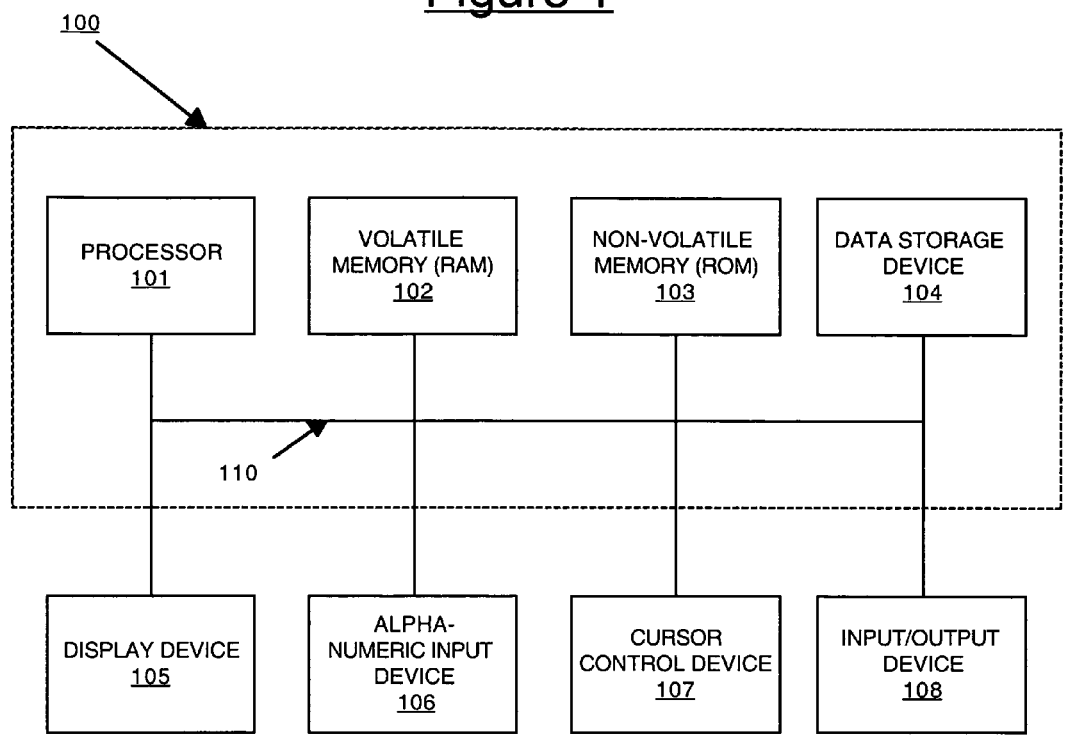
FIG. 1 is a block diagram of an exemplary computer system platform upon which embodiments of the present invention may be practiced.

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and the scope of the invention as defined by the appended claims. Furthermore, in the following detailed description of the present invention, numerous specific details are set forth in order to provide a thorough understanding of the present invention. However, it will be apparent to one skilled in the art that the present invention may be practiced without these specific details. In other instances, well-known methods, procedures, components, structures and devices have not been described in detail so as to avoid unnecessarily obscuring aspects of the present invention.

Various embodiments of the present invention, a method for generating a simulated network and a graphical user interface (GUI) for use in generating a simulated network, are presented herein. Embodiments of the present invention provide for a user to easily select devices of a network and place connections between the devices of a simulated network using a GUI. Furthermore, embodiments of the present invention provide a user with easy customization of the devices and connections of the simulated network. Also, Furthermore, embodiments of the present invention provide for automatically generating the simulated network based on the devices and the connections.

Some portions of the detailed descriptions which follow are presented in terms of procedures, steps, logic blocks, processing, and other symbolic representations of operations on data bits within a computer memory. These descriptions and representations are the means used by those skilled in the data processing arts to most effectively convey the substance of their work to others skilled in the art. A procedure, computer executed step, logic block, process, etc., is here and generally conceived to be a self-consistent sequence of steps of instructions leading to a desired result. The steps are those requiring physical manipulations of data representing physical quantities to achieve tangible and useful results. It has proven convenient at times, principally for reasons of common usage, to refer to these signals as bits, values, elements, symbols, characters, terms, numbers or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "receiving", "generating", "accessing", "compiling", or the like, refer to the actions and processes of a computer system or similar electronic computing device. The computer system or similar electronic device manipulates and transforms data represented as electronic quantities within the computer system's registers and memories into other data similarly represented as physical quantities within the computer system memories into other data similarly represented as physical quantities within the computer system memories or registers or other such information storage, transmission, or display devices.

Exemplary Hardware Upon which Embodiments of the Present Invention May be Implemented Refer now to FIG. 1 which illustrates an exemplary computer system 100 upon which embodiments of the present invention may be practiced. In general, computer system 100 comprises bus 110 for communicating information, processor 101 coupled with bus 110 for processing information and instructions, random access (volatile) memory (RAM) 102 coupled with bus 110 for storing information and instructions for processor 101, read-only (non-volatile) memory (ROM) 103 coupled with bus 110 for storing static information and instructions for processor 101, data storage device 104 such as a magnetic or optical disk and disk drive coupled with bus 110 for storing information and instructions.

In one embodiment, computer system 100 comprises an optional user output device such as display device 105 coupled to bus 110 for displaying information to the computer user, an optional user input device such as alphanumeric input device 106 including alphanumeric and function keys coupled to bus 110 for communicating information and command selections to processor 101, and an optional user input device such as cursor control device 107 coupled to bus 110 for communicating user input information and command selections to processor 101. Furthermore, an optional input/output (I/O) device 108 is used to couple computer system 100 onto, for example, a network.

Display device 105 utilized with computer system 100 may be a liquid crystal device, cathode ray tube, or other display device suitable for creating graphic images and alphanumeric characters recognizable to the user. Cursor control device 107 allows the computer user to dynamically signal the two-dimensional movement of a visible symbol (pointer) on a display screen of display device 105. Many implementations of the cursor control device are known in the art including a trackball, mouse, joystick or special keys on alphanumeric input device 106 capable of signaling movement of a given direction or manner of displacement. It is to be appreciated that the cursor control 107 also may be directed and/or activated via input from the keyboard using special keys and key sequence commands. Alternatively, the cursor may be directed and/or activated via input from a number of specially adapted cursor directing devices.

Figure 2:
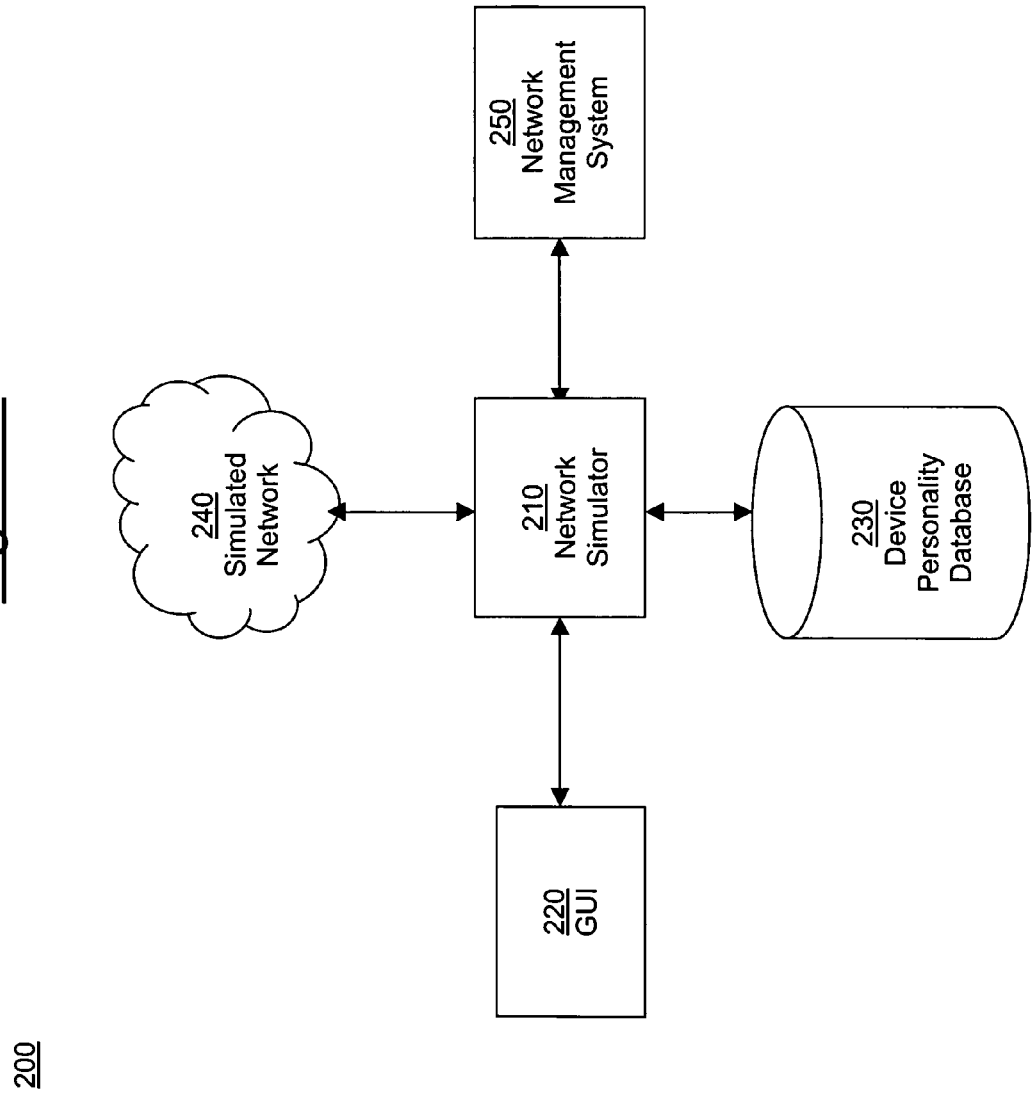
FIG. 2 is a block diagram of one embodiment of a system upon which the present invention may be practiced.

Referring now to FIG. 2, a block diagram of a system 200 upon which the present invention may be practiced is shown. As depicted in FIG. 2, system 200 includes network simulator 210, GUI 220, device personality database 230, simulated network 240, and network management system 250. In one embodiment, GUI 220 in conjunction with device personality database 230 is operable to perform a method for generating simulated network 240.

In one embodiment, network simulator 210, GUI 220, device personality database 230 and simulated network 240 are comprised within a single computer system (e.g., computer system 100 of FIG. 1). In another embodiment, network simulator 210, GUI 220, device personality database 230 and simulated network 240 are dispersed across a distributed computer network. In one embodiment, the components of system 200 communicate via the communications protocols of system 200. For example, network simulator 210 may communicate with network management system 250 via simple network management protocol (SNMP).

Referring still to FIG. 2, system 200 includes well known network technologies. For example, system 200 can be implemented using LAN technologies (e.g., Ethernet), the Internet, or other wired or wireless network technologies. The communications links between network simulator 210, GUI 220, device personality database 230, simulated network 240, and network management system 250 can be implemented using, for example, a telephone circuit, communications cable, optical cable, wireless link, or the like.

In one embodiment, network simulator 210 is a software application for testing network management system 250 by presenting simulated network 240 to network management system 250. In one embodiment, simulated network 240 is an ASCII file that includes information regarding devices and connections of a network such that network management system 250 operates as if it were connected to an actual network.

GUI 220 provides a workspace in which a user can easily create a network topology for a network simulation, which can be automatically compiled into simulated network 240. It should be appreciated that GUI 220 can be comprised within any electronic device having a GUI, including but not limited to: a desktop computer system, a laptop computer system, a handheld computer system, or any other electronic device capable of network communications.

Figure 3A:
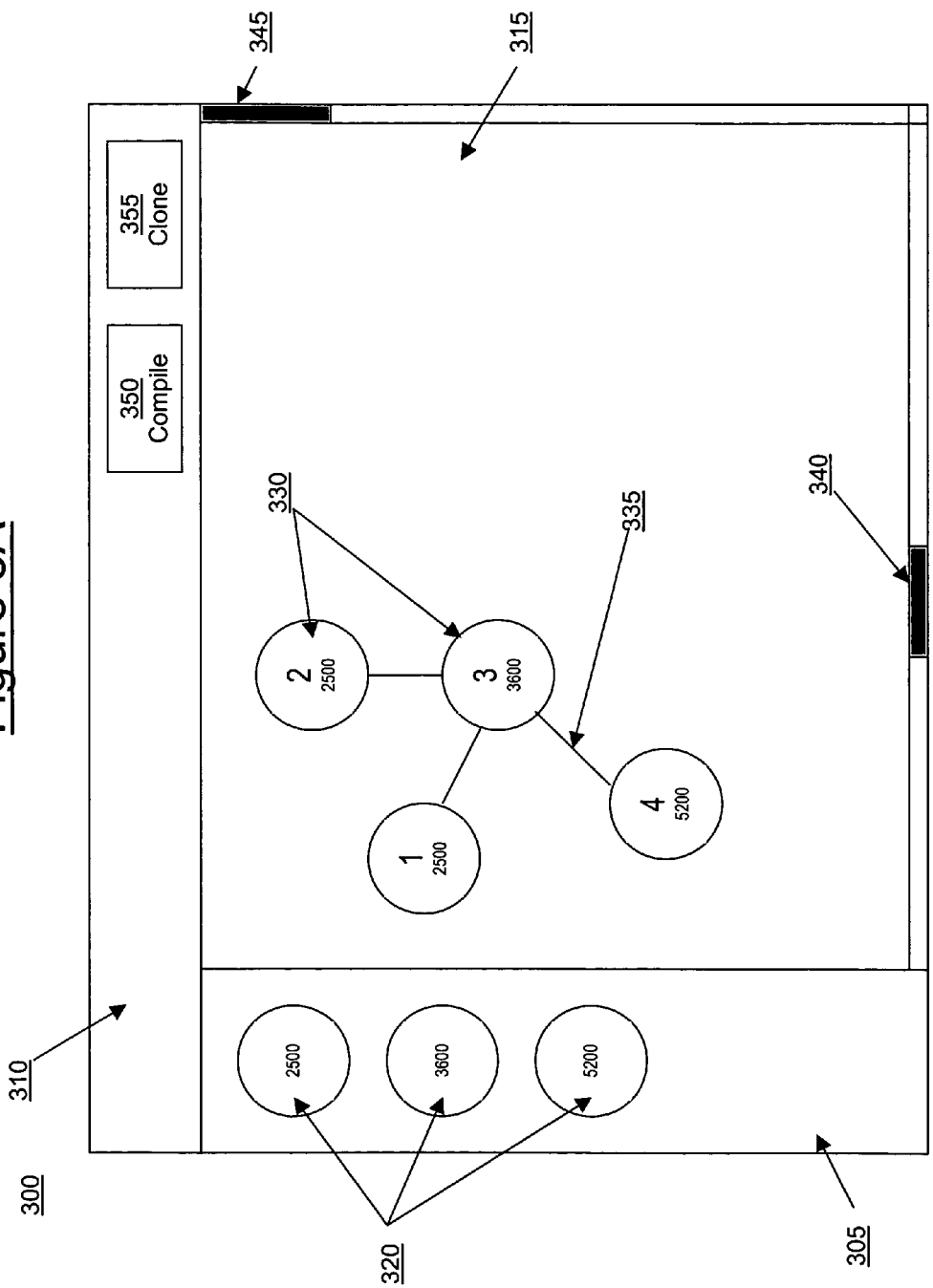

A Method for Generating a Simulated Network Using a Graphical User Interface FIGS. 3A and 3B are screen shots of an exemplary GUI 300 for use in generating a simulated network, in accordance with one embodiment of the present invention. In one embodiment, GUI 300 is displayed on display device 105 of computer system 100 of FIG. 1. It is appreciated that GUI 300 is exemplary only, and that GUI 300 may include different numbers and shapes of elements and windows other than those that are illustrated.

With reference to FIG. 3A, GUI 300 includes a device palette 305, a tool bar 310, and a workspace 315. Device palette 305 includes a plurality of icons 320, in which an icon is associated with a particular device. In one embodiment, the devices include routers and switches. However, it should be appreciated that icons 320 may represent other devices for use in computer networking, such as hubs, or other computing devices, such as servers, computer systems, or voice over IP telephones. Furthermore, it should be appreciated that a user can add user-defined devices to palette 305. As shown in GUI 300, three different types of devices are shown, a 2500 router, a 3600 router, and a 5200 router.

In one embodiment, the devices as represented by icons 320 have associated characteristics that include static information for a respective device. In one embodiment, the characteristics are stored in device personality database 230. Static information refers to information that is associated with a device, such as the device type, the device operating system version, and device interface information. The device interface information includes the number of ports for the device and the type of ports.

A user interfacing with GUI 300 is able to select an icon 320 and place it into workspace 315. In one embodiment, a user selects and places icon 320 by interfacing with cursor control device 107 of FIG. 1 (e.g., a mouse). As shown, workspace 315 includes four selected icons 330. In one embodiment, when an icon is placed in workspace 315, the associated device is automatically assigned a unique address. In one embodiment, the unique address is an Internet Protocol (IP) address. For purposes of simplification, selected icons 330 of GUI 300 have addresses of 1, 2, 3 and 4, and are referred to herein as devices 1, 2, 3 and 4. Specifically, devices 1 and 2 are 2500 routers, device 3 is a 3600 router, and device 4 is a 5200 router. Horizontal scroll bar 340 and vertical scroll bar 345 allow a user to scroll to areas of workspace 315 not visible due to screen size restrictions. A device of the network is brought up (and also may be turned down) by updating the Management Information Base (MIB) for the device. One aspect of the MIB is a neighbor discovery protocol (NDP) table.

Once a plurality of icons have been selected and placed in workspace 315, a user interfacing with GUI 300 is able to draw connections 335 between selected icons 330. In one embodiment, a user draws connection 335 by interfacing with cursor control device 107 of FIG. 1 (e.g., a mouse). A connection 335 represents a communication channel between two devices. In one embodiment, connection 335 includes default attributes. However, the attributes of connection 335 can be modified by a user interfacing with connection 335 (e.g., by right clicking connection 335). The attributes may include, but are not limited to, link speed, port numbers and port types.

In one embodiment, once a connection 335 is drawn between two selected icons 330, a NDP table for each associated device is automatically updated. A NDP table includes connection information for the particular device, specifically the identification of all other devices connected to the device. In one embodiment, the NDP table is a Cisco discovery protocol table. However, it should be appreciated that NDP table can be any information identifying neighboring devices. For example, FIG. 4B shows an exemplary NDP table 450 for device 3, including interface identification, connection type, current status (e.g., up or down) and the neighbor device.

A user places selected devices 330 and connections 335 to create a simulated network topology. In order to simulate large networks having several thousand devices, it may be time consuming to manually select and place every device and connection. With reference to FIG. 3B, a cloning feature of GUI 300, in accordance with an embodiment of the present invention, is shown. A group 360 of selected icons in workspace 315 is selected by a user. The user then interacts with clone element 355 that is operable to clone group 360 into second group 365.

By cloning group 360, the same network topology of group 360 is copied as second group 365. However, the device addresses for each of the devices of second group 365 is automatically adjusted such that each device included in workspace 365 has a unique address. Second group 365 includes the same types of devices, the same connection information and the same NDP tables as group 360, except that the information is transposed to account for the unique device addresses. As shown, second group 365 includes icons of GUI 300 having addresses of 5, 6, 7 and 8, and are referred to herein as devices 5, 6, 7 and 8. Specifically, devices 5 and 6 are 2500 routers, device 7 is a 3600 router, and device 8 is a 5200 router. Connection 370 between device 3 and device 7 is shown to illustrate connecting group 360 to second group 365, thereby creating a completely connected network topology in workspace 315.

With reference to both FIGS. 3A and 3B, a simulated network based on the network topology is generated by interfacing with compile element 350. In one embodiment, the simulated network is represented as an ASCII file. This ASCII file is also referred to herein as a build file. The build file includes all information necessary to simulate a network for network management system 250. Process 500 of FIG. 5 describes one embodiment of generating a simulated network in response to interfacing with compile element 350.

FIGS. 4A and 4B are tables 400 and 450 of an exemplary build file, in accordance with one embodiment of the present invention. Table 400 includes information describing the configuration of each device of the network topology for FIG. 3A. For example, device 1 is a 2500 router running on operating system 10.5. It should be appreciated that any information used for creating a simulated network may be included in table 400, and table 400 is not limited to the present embodiment. As described above, table 450 is a NDP table for device 3 of FIG. 3A, including interface identification, connection type, current status (e.g., up or down) and the neighbor device. For example, interface 0 of device 3 is a 10 MB Ethernet connection, currently up, and is connected to device 2.

FIG. 5 is a flow chart illustrating a process 500 for generating a simulated network using a GUI, in accordance with one embodiment of the present invention. In one embodiment, process 500 is carried out by processors and electrical components under the control of computer readable and computer executable instructions. The computer readable and computer executable instructions reside, for example, in data storage features such as computer usable volatile and non-volatile memory (e.g., volatile memory 102 and non-volatile memory 103 of FIG. 1). However, the computer readable and computer executable instructions may reside in any type of computer readable medium. Although specific steps are disclosed in process 500, such steps are exemplary. That is, the embodiments of the present invention are well suited to performing various other steps or variations of the steps recited in FIG. 5. In one embodiment, process 500 is performed in response to a user interfacing with compile element 350 of FIG. 3A.

At step 510 of process 500, a network topology generated at a GUI by a user is received, wherein the network topology includes a plurality of devices and at least one connection. In one embodiment, the network topology includes device selection and placement location information for the plurality of devices and information describing the connections between devices of the plurality of devices. In one embodiment, the plurality of devices includes routers and switches.

A build file describing the simulated network is automatically generated based on the network topology. In one embodiment, as described at step 520, characteristics for one device of the plurality of devices is accessed, wherein the characteristics include static information for the device. In one embodiment, the static information includes the device type, the device operating system version and the device interface information.

At step 530, a NDP table for the device is accessed, wherein the NDP includes connection information for the device. In one embodiment, the connection information of the neighbor discovery protocol table includes identification of a neighbor device for an active interface of the device.

At step 540, it is determined whether there are any more devices within the network topology that have not been accessed. If there are more devices to access, process 500 accesses the next device, as shown at step 550. Process 500 then proceeds to step 520. Alternatively, if all devices of the network topology have been accessed, process 500 proceeds to step 560.

At step 560, the static information and connection information is compiled into the build file to generate the simulated network. The build file thereby includes the static information and connection information for each device of the network topology. In one embodiment, the build file is an ASCII text file. In one embodiment, the build file is for use by a network management simulator to simulate a network.

The described embodiments of the present invention provide a method for generating a simulated network using a GUI. By interfacing with a GUI, a user is able to create and edit the simulated network, thereby obviating the need for manually coding a simulated network. Once the user creates a network topology for the simulated network, a build file for use in simulating the simulated network is generated. Furthermore, by providing a user with the ability to clone groups of devices of the simulated network, large simulated networks can be large simulated networks can be quickly created, edited and maintained.

Various embodiments of the present invention, a method for generating a simulated network, are thus described. While the present invention has been described in particular embodiments, it should be appreciated that the present invention should not be construed as limited by such embodiments, but rather construed according to the below claims.

What is claimed is:

1. A method for generating a simulated network, the method comprising:
   receiving a network topology generated at a graphical user interface by a user, wherein the network topology comprises a plurality of devices and at least one connection; and
   automatically generating a build file describing the simulated network based on the network topology wherein the automatically generating a build file comprises:
   accessing characteristics for at least one device of the plurality of devices, the characteristics including static information for the device;
   accessing a neighbor discovery protocol table for the device, the neighbor discovery protocol table including connection information for the device; and
   compiling the static information and connection information into the build file.

2. The method as recited in claim 1 wherein the automatically generating the build file further comprises repeating the accessing the characteristics, the accessing the neighbor discovery protocol table, and the compiling for the plurality of devices.

3. The method as recited in claim 1 wherein the plurality of devices comprises routers and switches.

4. The method as recited in claim 1 wherein the static information comprises the device type, the device operating system version and the device interface information.

5. The method as recited in claim 3 wherein the connection information of the neighbor discovery protocol table comprises identification of a neighbor device for an active interface of the device.

6. The method as recited in claim 1 wherein the build file is a text file.

7. The method as recited in claim 1 wherein the build file is for use by a network management simulator to simulate a network.

8. A computer-usable medium having computer-readable program code embodied therein for causing a computer system to perform a method of for generating a simulated network using a graphical user interface, the method comprising:
   receiving a device selection and placement location for a plurality of devices at the graphical user interface;
   receiving at least one connection between devices of the plurality of devices at the graphical user interface;
   automatically generating the simulated network describing the network based on the plurality of devices and the connection; and
   accessing characteristics for at least one device of the plurality of devices, the characteristics including static information for the device;
   accessing a neighbor discovery protocol table for the device, the neighbor discovery protocol table including connection information for the device; and
   compiling the static information and connection information into a build file representing the simulated network.

9. The computer-usable medium of claim 8 wherein the automatically generating the simulated network further comprises repeating the accessing the characteristics, the accessing the neighbor discovery protocol table, and the compiling for the plurality of devices.

10. The computer-usable medium of claim 8 wherein the plurality of devices comprises routers and switches.

11. The computer-usable medium of claim 8 wherein the static information comprises the device type, the device operating system version and the device interface information.

12. The computer-usable medium of claim 11 wherein the connection information of the neighbor discovery protocol table comprises identification of a neighbor device for an active interface of the device.

13. The computer-usable medium of claim 8 wherein the build file is a text file.

14. The computer-usable medium of claim 8 wherein the simulated network is for use by a network management simulator to simulate a network to a network management system.

15. A system for generating a simulated network, the method comprising:
   means for receiving a network topology generated at a graphical user interface by a user, wherein the network topology comprises a plurality of devices and at least one connection;
   means for automatically generating a build file describing the simulated network based on the network topology; and
   means for accessing characteristics for at least one device of the plurality of devices, the characteristics including static information for the device;
   means for accessing a neighbor discovery protocol table for the device, the neighbor discovery protocol table including connection information for the device; and
   means for compiling the static information and connection information into the build file.

16. The system as recited in claim 15 wherein the plurality of devices comprises routers and switches.

17. The system as recited in claim 13 wherein the static information comprises the device type, the device operating system version and the device interface information.

18. The system as recited in claim 17 wherein the connection information of the neighbor discovery protocol table comprises identification of a neighbor device for an active interface of the device.

19. The system as recited in claim 15 wherein the build file is a text file.

* * * * *